(12) United States Patent
Pulling et al.

(10) Patent No.: US 6,254,114 B1
(45) Date of Patent: *Jul. 3, 2001

(54) COMPOSITE STABILIZER BAR LINK

(75) Inventors: Jared C. Pulling, Grand Rapids; Jeffrey L. Kincaid, Clarkston; Darrell L. Jacques, Clinton Township, all of MI (US)

(73) Assignee: American Axle & Manufacturing, Inc., Detroit, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,165

(22) Filed: Nov. 9, 1998

(51) Int. Cl.[7] ........................................................ B62D 7/20
(52) U.S. Cl. ...................................... 280/93.511; 403/135
(58) Field of Search .......................... 280/93.502, 93.51, 280/93.511; 403/122, 133, 132, 130, 135

(56) References Cited

U.S. PATENT DOCUMENTS

| | | | |
|---|---|---|---|
| 4,143,983 | * 3/1979 | McEowen | 403/39 |
| 4,883,287 | 11/1989 | Murakami et al. | |
| 4,916,788 | * 4/1990 | Mitoya | 403/122 |
| 5,062,656 | 11/1991 | Hynds et al. | |
| 5,165,306 | 11/1992 | Hellon | |
| 5,352,059 | * 10/1994 | Ueno et al. | 403/122 |
| 5,492,428 | 2/1996 | Hellon | |
| 5,551,722 | 9/1996 | Schwartz et al. | |
| 5,609,433 | * 3/1997 | Pazdirek et al. | 403/140 |
| 5,642,956 | 7/1997 | Hale | |
| 5,672,023 | * 9/1997 | Lieber et al. | 403/138 |
| 5,672,024 | * 9/1997 | Maughan et al. | 403/141 |
| 5,704,631 | 1/1998 | Sparks et al. | |
| 5,772,352 | * 6/1998 | Fukumoto et al. | 403/144 |
| 5,876,148 | * 3/1999 | Kraps | 403/119 |
| 5,885,022 | * 3/1999 | Maughan et al. | 403/135 |
| 5,954,353 | * 9/1999 | Kincaid et al. | 280/124.152 |
| 6,076,840 | * 6/2000 | Kincaid et al. | 403/122 |

FOREIGN PATENT DOCUMENTS

| | | | |
|---|---|---|---|
| 3149628 | * 7/1983 | (DE) | 403/122 |
| 2522748 | * 9/1983 | (FR) | 403/122 |
| 0297525 | * 12/1987 | (JP) | 403/130 |

* cited by examiner

*Primary Examiner*—Brian L. Johnson
*Assistant Examiner*—Matthew Luby
(74) *Attorney, Agent, or Firm*—Harness, Dickey & Pierce, P.L.C.

(57) ABSTRACT

A suspension assembly is provided including a pair of stabilizer bar links which interconnect the opposite ends of a stabilizer bar to a pair of suspension members. Each stabilizer bar link has a central body or housing constructed of a polymeric resin including 20 to 40% glass fill for increased mechanical properties. A bowl is formed at each end of the housing and is adapted to support a bearing member defining a socket. A ball segment of a ball stud is disposed in the socket to facilitate angular movement of the ball stud relative to the bowl. The bearing member includes a plurality of axial slots extending from an open end of the socket to define resilient socket tabs for enabling the bearing member to snap over and retain the ball stud. The bearing member also includes a collar segment which engages the bowl, and a plurality of circumferential spring tabs engaging the ball stud to provide for wear compensation and to reduce the effect of axial compression variation. A polymeric retention cap is snap fit into each bowl of the housing to secure the ball stud and the bearing member therein.

24 Claims, 4 Drawing Sheets

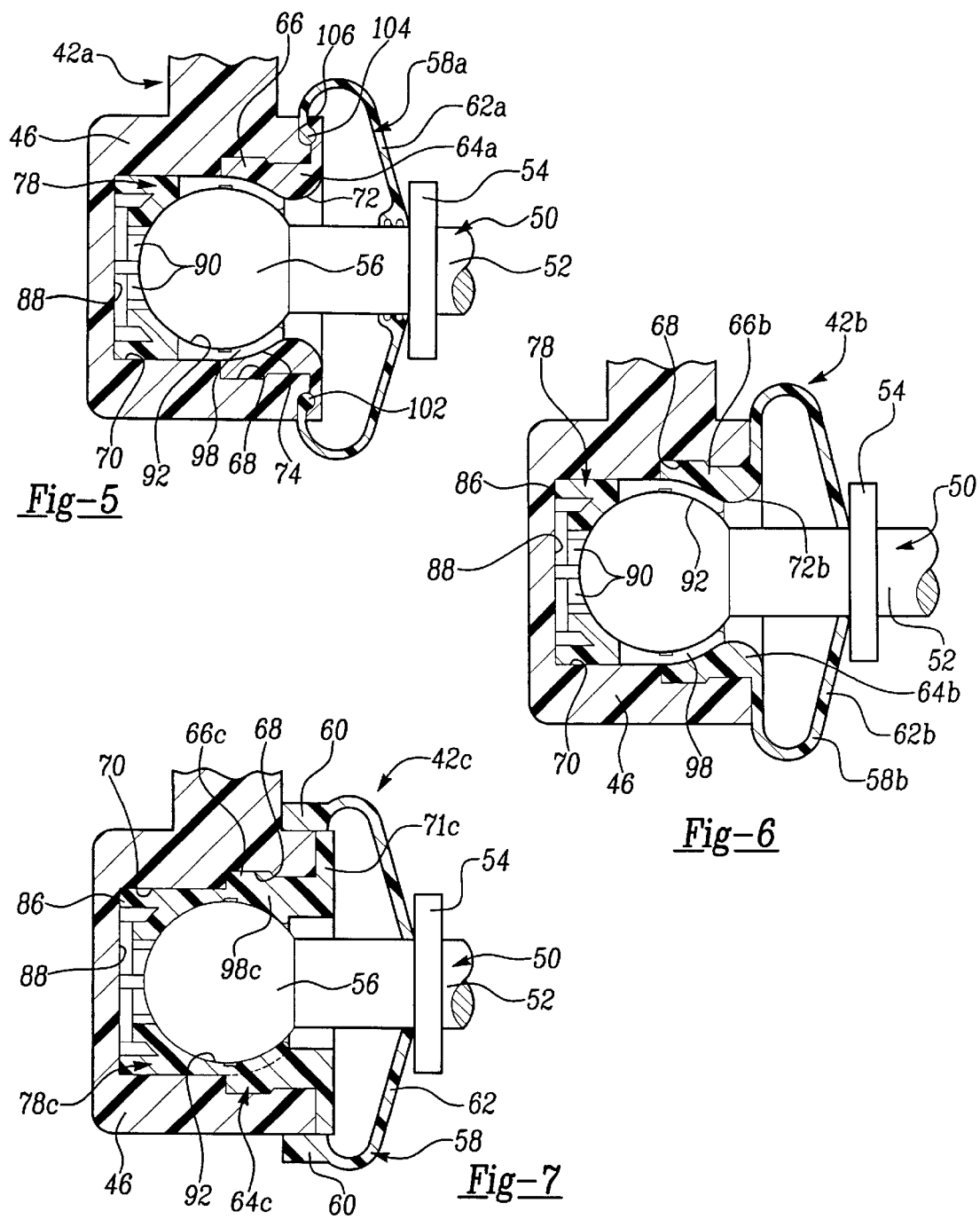

COMPOSITE STABILIZER BAR LINK

FIELD OF THE INVENTION

The present invention relates to a suspension system for motor vehicles and, more particularly, to a composite stabilizer bar link for connecting a stabilizer bar to a control arm of the suspension system.

BACKGROUND OF THE INVENTION

It is a common practice for motor vehicles to be equipped with independent suspension systems for absorbing road shock and other vibrations while providing a smooth and comfortable ride for the vehicle occupants. In suspension systems of this type, a stabilizer bar is often used to increase the roll rigidity and improve the steering stability of the vehicle. Typically, the stabilizer bar is a rod-shaped member having an elongated central segment oriented to extend laterally across the vehicle and an arm segment extending longitudinally at each end of the central segment to form a generally U-shaped configuration.

The central segment of the stabilizer bar is supported for rotation about its own longitudinal axis by one or more mounting brackets which are fixed to the vehicle body or frame. Most commonly, the mounting brackets are positioned in close proximity to the arm segments for minimizing any bending moments which may be induced into the stabilizer bar. The distal end of each arm segment is coupled to a control arm of the suspension system by a stabilizer bar link.

When the vehicle is subjected to a lateral rolling force such as, for example, while the vehicle negotiates a turn, the arm segments pivot in opposite directions with respect to the longitudinal axis of the central segment. As a result, torsional reaction forces are generated which act through the arm segments to urge the control arms to move toward their normal position. Thus, the vehicle body will be prevented from excessive rolling or leaning to either side by the torsional resistance produced by the stabilizer bar.

As noted, each end of the stabilizer bar is typically attached to a corresponding control arm by a stabilizer bar link. A recent trend in vehicular suspensions is to use a direct-acting stabilizer bar link, or direct link, to connect the stabilizer bar and the lower control arm. Direct links commonly include ball joints for accommodating the angularity between the stabilizer bar and the control arm as the suspension travels through its range of motion. Direct links also eliminate the amount of compliance that is experienced before the stabilizer bar begins to urge the control arm to its normal position during vehicle maneuvers. Although direct links have experienced great success, there is room for improvement in the art. For instance, the performance advantages gained by the direct link are typically set off by the cost and complexity required for its manufacture.

Therefore, it would be desirable to provide a direct link for a stabilizer bar which may be manufactured quickly and easily with minimum complexity.

SUMMARY OF THE INVENTION

The present invention provides a suspension assembly for a motor vehicle including a pair of stabilizer bar links which interconnect the opposite ends of a stabilizer bar to a pair of suspension members. Each stabilizer bar link has a central body or housing constructed of a polymeric resin including 20% to 40% glass fill for increased mechanical properties. A bowl is formed at both ends of the housing which are fitted with a cup-shaped bearing member defining a spherical socket. The ball segment of a ball stud is mounted in the socket and a polymeric retention cap is snap fit into each bowl of the housing to secure the bearing member and the ball stud therein. The bearing members include a plurality of axial slots extending inwardly from the open end of the socket to define a set of resilient socket tabs enabling the bearing members to snap over the ball segments of the ball studs. Each bearing member also includes a cylindrical collar adapted to engage the bowl and a plurality of circumferential spring tabs adapted to engage the distal end of the ball segment to provide for wear compensation and to reduce the effect of axial compression variation.

As a further feature of the present invention, the retention cap may be formed in combination with a retainer ring seal or the bearing. As such, the number of piece part components may be reduced.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 5 is a sectional view of a portion of the stabilizer bar link shown in FIG. 2 illustrating a ball joint constructed according to another embodiment of the present invention;

FIG. 6 is a sectional view of a portion of the stabilizer bar link shown in FIG. 2 illustrating a ball joint constructed according to yet another embodiment of the present invention; and FIG. 7 is a sectional view of a portion of the stabilizer bar link shown in FIG. 2 illustrating a ball joint constructed according to still yet another embodiment of the present invention.

DETAILED DESCRIPTION OF THE INVENTION

In general, the present invention is directed toward a stabilizer bar link for connecting a stabilizer bar to a suspension member, such as a control arm, in a vehicle suspension. The stabilizer bar link of the present invention is adapted to replace most conventional stabilizer bar links and to work in conjunction with a stabilizer bar to provide improved performance in a vehicle suspension. Thus, the stabilizer bar link of the present invention may be utilized with a wide variety of suspension systems and is not intended to be limited to the particular application described herein.

Figure 1:
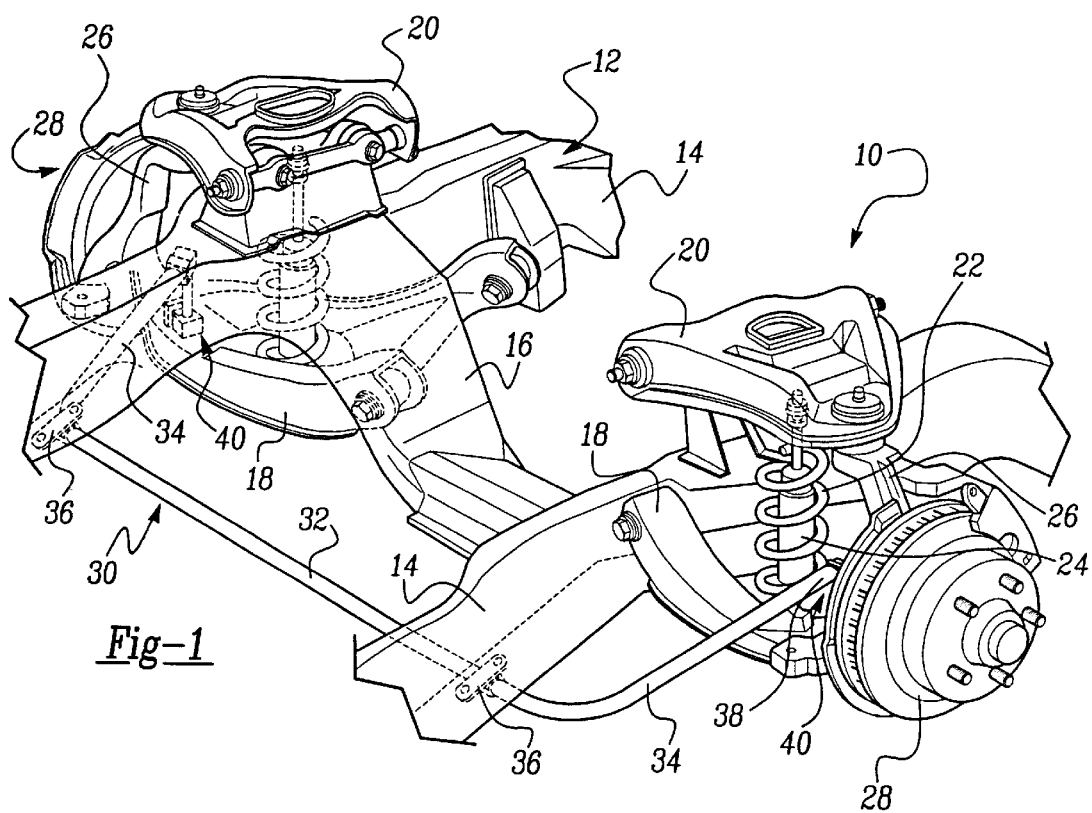
FIG. 1 is a perspective view of an exemplary independent front wheel suspension system into which the present invention can be incorporated.

Turning now to the drawings, FIG. 1 shows an independent front wheel suspension system, generally indicated at 10, of the type having upper and lower control arms and a strut assembly at each wheel and which are suspended from the vehicle frame. Reference will be made to a vehicle frame in the present disclosure, yet those skilled in the art will recognize that many current vehicles do not have a frame as such but instead have regions of the body which act as an integrated frame structure. With this in mind, frame 12 is shown to partially include a pair of longitudinal side rails 14 and a crossbeam 16.

Suspension system 10 includes a long lower control arm 18 and a short upper control arm 20 which are both pivotally attached to frame 12. A strut assembly having a helical coil spring 22 and a strut damper 24 is retained between an intermediate portion of lower control arm 18 and frame 12 to support the weight of the vehicle body and any loads which are transmitted through lower control arm 18. Upper control arm 20 is connected to lower control arm 18 by a steering knuckle 26. A hub and rotor assembly 28 is rotatably attached to a spindle portion (not shown) of steering knuckle 26 such that a wheel and tire (also not shown) may be mounted thereon.

A stabilizer bar 30 is shown to include an elongated central segment 32 which extends laterally across the vehicle and a pair of arm segments 34 which extend longitudinally along the vehicle at each end of central segment 32. Central segment 32 is rotatably attached to frame rails 14 by a pair of mounting brackets 36. A distal end 38 of each arm segment 34 is connected to a corresponding lower control arm 18 by a stabilizer bar link 40 made in accordance with the teachings of the present invention.

Figure 2:
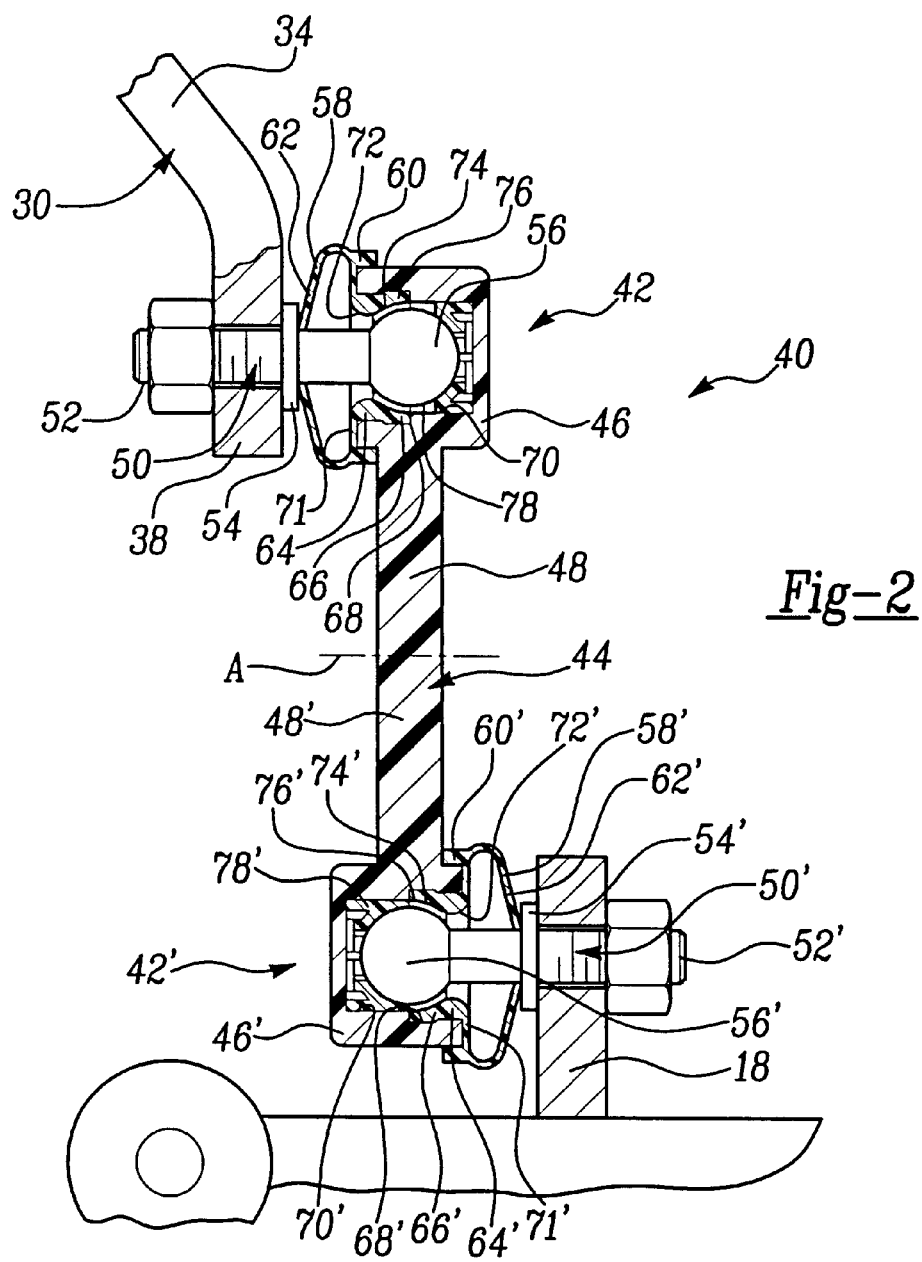
FIG. 2 is a sectional view of a portion of the suspension system shown in FIG. 1 and which illustrates a stabilizer bar link made in accordance with one preferred embodiment of the present invention.

Referring to FIG. 2, stabilizer bar link 40 is shown fastened to stabilizer bar 30 at one end and to lower control arm 18 at its opposite end. In general, the components of stabilizer bar link 40 are symmetrical about a horizontal plane, identified by construction line "A". In fact, stabilizer bar link 40 is assembled from a set of components including two ball joints 42 and 42' which are rigidly interconnected by a body or housing 44. Due to the similarity of the components associated with ball joint 42' with respect to the components of ball joint 42, its components are identified with the same reference numerals but having a primed designation. While the components of ball joint 42 are described in detail hereinafter, it is understood that the description is applicable also to the corresponding primed components of ball joint 42'.

Housing 44 is formed of a polymeric material such as nylon or acetal resin. The housing 44 also includes 20% to 40% glass fill for increasing its mechanical properties over the base polymer. The housing 44 includes a bowl-shaped segment 46 formed at the end of an elongated center rod segment 48. Preferably, rod segment 48 has an I-shaped (I-beam) cross section, which may include additional webbing if desired. Alternatively, rod segment 48 may include a T-shaped cross section depending on loading and packaging requirements.

Ball joint 42 includes a ball stud 50 having a shank segment 52, a collar segment 54, and a ball segment 56. Ball segment 56 of ball stud 50 is retained in bowl 46 as described in greater detail below. An elastomer boot seal 58 includes an end retainer ring portion 60 encircling the outer perimeter of bowl 46 and a skirt portion 62 extending under tension at an angle from end retainer portion 60 to a location proximate collar segment 54 of ball stud 50. Typically, end retainer portion 60 would be clamped to bowl 46. Boot seal 58 prevents debris from entering bowl 46 and interfering with the operation of ball joint 42. As illustrated, boot seal 58 is a ring seal which are generally known in the art. However, any suitable seal may be used as a substitute therefore.

Ball joint 42 also includes a cup-shaped bearing member 78 disposed in bowl 46 and which defines a socket 92 adapted to engage ball segment 56 of ball stud. Ball joint 42 also includes a retention cap 64 for securing bearing member 78 and ball segment 56 of ball stud 50 within bowl 46. Retention cap 64 is preferably formed of the same base polymer (e.g., nylon or acetal resin) as housing 44 and may or may not include glass fibers depending upon strength requirements. Retention cap 64 includes an annular rim projection 66 which extends into and engages an annular recess 68 formed in an interior wall 70 of bowl 46. Retention cap 64 further includes a radial flange 71 positioned against the end surface of bowl 46. As such, retention cap 64 may be "snap-fit" into place.

Figure 3:
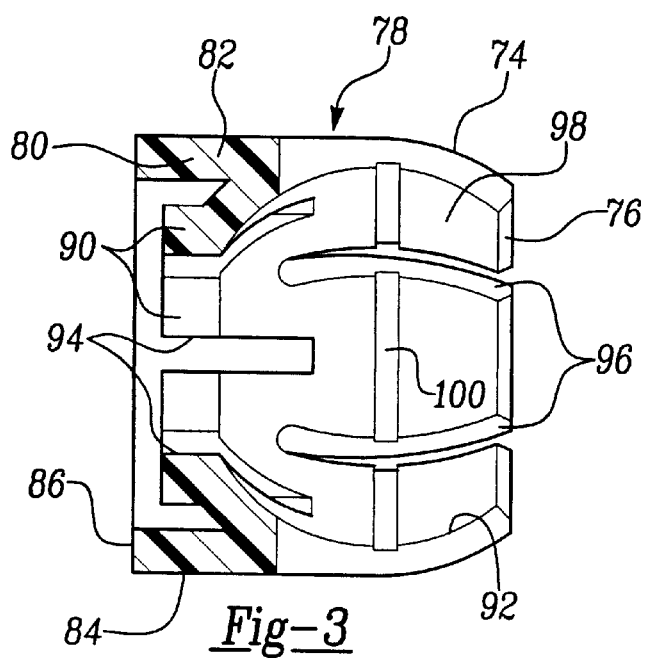
FIG. 3 is a cross sectional view showing the bearing of the stabilizer bar link shown in FIG. 2.
Figure 4:
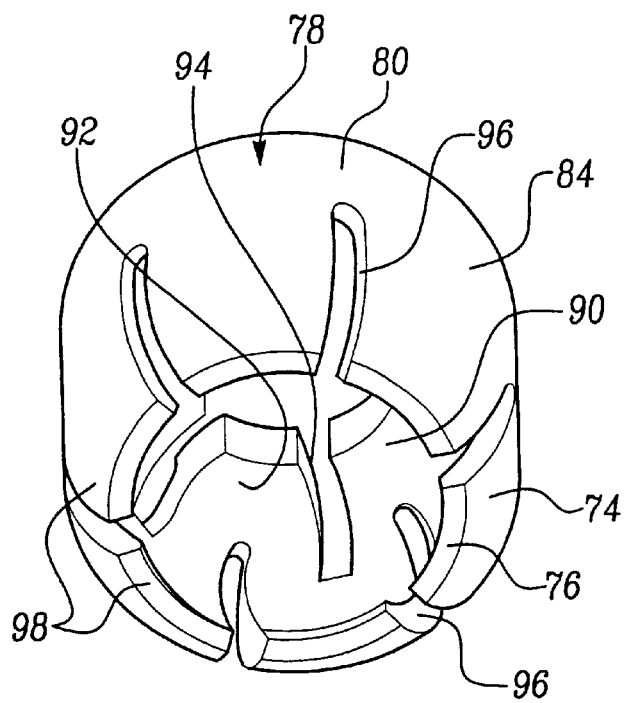
FIG. 4 is a perspective view of the bearing shown in FIG. 3.

Retention cap 64 includes a reduced diameter annular retention surface 72 which interferes with an external surface 74 of bearing member 78 adjacent to its open end portion 76. Bearing member 78 is preferably formed of a polymer such as acetal resin having low friction and wear properties. Referring now also to FIGS. 3 and 4, bearing member 78 includes a cylindrical collar 80 extending axially from a closed end 82 and having an outer wall surface 84 adapted to engage interior wall surface 70 of bowl 46 and an end surface 86 adapted to engage bottom surface 88 of bowl 46. Bearing member 78 also includes a plurality of arcuately-shaped spring tabs 90 extending interior of collar 80 and which are shaped to define spherical socket 92 complimenting the outer surface of ball segment 56 of ball stud 50. Adjacent spring tabs 90 are separated by slots 94. As such, spring tabs 90 are resilient for improving wear "take-up" with reduced torque and lash variation.

Open end portion 76 of bearing member 78 includes a plurality of axially extending slots 96 to define a set of circumferentially arranged socket tabs 98. Slots 96 enable socket tabs 98 to radially expand to accommodate entry of ball segment 56 of ball stud 50 therein. As such, ball segment 56 may be snap fit into socket 92 of bearing member 78. A circumferential groove 100 is formed in tabs 98 for distribution of lubrication to assist in smooth angular movement of ball segment 56 relative to bearing member 78.

Turning now to FIG. 5, an alternative embodiment of ball joint 42 is illustrated. In this embodiment, like reference numerals are used to identify like components of the previous embodiments while modified components are identified with an "a" suffix. In particular, seal 58a of ball joint 42a has a lip 102 that is captured between a groove 104 in retention cap 64a and a groove 106 in bowl 46a. Skirt portion 62a of seal 58a extends to a location proximate collar portion 54 of ball stud 50. According to this configuration, the need to clamp end retainer portion 60 to bowl 46 is eliminated.

Referring to FIG. 6, another alternative embodiment of the present invention is illustrated. In this embodiment of ball joint 42b, bowl 46 houses ball segment 56 of ball stud 50. Bearing member 78 is interposed between ball segment 56 and bowl 46. Bearing member 78 is secured about ball segment 56 via a retention cap 64b. Seal 58b is formed integral with retention cap 64b and extends to a location proximate collar portion 54 of ball stud 50. As such, the need for a separate seal component is eliminated.

Turning now to FIG. 7, still yet another embodiment of the present invention is illustrated. In this embodiment, a bearing member 78c is interposed between ball segment 56 and bowl 46 and includes a retention cap segment 64c integrally formed to extend from tabs 98c of bearing member 78c. Retention cap segment 64c of bearing member 78c is substantially similar to retention cap 64 of FIG. 2. Seal 58 includes retainer portion 60 encircling bowl 46 and a skirt portion 62 extending to a location proximate the collar portion 54 of ball stud 50. Accordingly, the need for separate bearing and retention cap components is eliminated.

It should also be noted that the present invention may be practiced with bearing member 78 formed integrally with bowl portion 46 since housing 44 is formed of a polymer material. In this case, bowls 46 would be shaped as one of the bearing embodiments described above. Preferably, bowls 46 would not include the glass fill of the remainder of housing 44 since this could act as an abrasive. Further, by incorporating additional polymer fillers such as PTFE, graphite and/or silicon in the bowl (or bearings in previous embodiments), the need for grease could be eliminated.

As opposed to prior art stabilizers bar links, the housing of the present invention accommodates a simple two-piece mold for manufacturing which reduces lead-time, tooling and piece cost. Conventional housing designs have center sections parted perpendicularly to the bowls which requires the use of additional mold slides. Further, the present invention eliminates a potential leak path of conventional designs by completely sealing the retention cap to housing joint from the environment with the ring seal. The forgiving snap-over spherical bearing with spring tabs replaces the functions of a spring, spring seat bearing, and ball seat bearing of prior art devices to provide for wear compensation and to reduce axial compression variation effect thereby reducing part count without reducing performance. The use of a snap fit retention cap eliminates the need to retain the internal components of the link with sonic or friction welding or bonding as common in the prior art thus eliminating the process development, machine cycle time and tooling costs typical of conventional joining methods.

Those skilled in the art can now appreciate from the foregoing description that the broad teachings of the present invention can be implemented in a variety of forms. For example, the unique and novel concepts in the design could be applied to other products such as steering linkage joints and suspension ball joints. Therefore, while this invention has been described in connection with particular examples thereof, the true scope of the invention should not be so limited since other modifications will become apparent to the skilled practitioner upon a study of the drawings, specification, and following claims.

What is claimed is:

1. A stabilizer bar link adapted for interconnecting a stabilizer bar to a suspension member within a vehicular suspension system, the stabilizer bar link comprising:

a polymer housing including a bowl formed at an end of a rod segment;

a bearing member disposed in said bowl, said bearing member defining a spherical socket including a plurality of inwardly extending spring tabs and having an axially extending collar portion for engaging said bowl;

a ball stud having a ball segment disposed within said socket of said bearing member and supported by said spring tabs; and a retention member having a radially extending annular rim for securing to said bowl such that said radially extending annular rim snap fits inside of said bowl abuttingly engaging said bearing member such that said ball stud and said bearing member are retained in said bowl formed at the end of said rod segment.

2. The stabilizer bar link of claim 1 wherein said spring tabs extend from said bearing member interior of said collar portion and are separated by slots.

3. The stabilizer bar link of claim 1 wherein said bearing member further comprises a plurality of axial slots extending from an open end of said socket and enabling said socket of said bearing member to expand to accommodate entry of said ball segment therein.

4. The stabilizer bar link of claim 1 wherein said retention member radially extending annular rim engages an annular recess formed in said bowl.

5. The stabilizer bar link of claim 1 wherein said retention member is formed integrally with said bearing member.

6. The stabilizer bar link of claim 1 further comprising a seal member engaging said bowl portion and said ball stud to prevent debris from entering said bowl.

7. The stabilizer bar link of claim 6 wherein said seal member includes a ring segment encircling a perimeter of said bowl portion.

8. The stabilizer bar link of claim 6 wherein said seal member is formed integrally with said retention member.

9. The stabilizer bar link of claim 1 wherein said bearing member is formed integrally with said bowl and is made of the same base polymer as said housing.

10. A stabilizer bar link for interconnecting a stabilizer bar to a suspension member within a vehicular suspension system, the stabilizer bar link comprising:

a polymer housing including a bowl formed at an end of a rod segment;

a bearing member disposed in said bowl and defining a socket and having an axially extending collar portion for engaging said bowl;

a ball stud having a ball segment disposed within said socket of said bearing member; and a retention member having an annular portion extending inside said bowl such that said annular portion fits into said bowl engaging said bowl and said bearing member such that said bearing member is retained in said bowl and such that said ball segment of said ball stud is retained in said bowl for angular movement relative thereto.

11. The stabilizer bar link of claim 10 wherein said retention member includes an annular rim engaging a recess formed in said bowl.

12. The stabilizer bar link of claim 11 wherein said rim radially projects from an exterior of said retention member.

13. The stabilizer bar link of claim 10 wherein said socket of said bearing member includes a plurality of inwardly extending spring tabs spaced apart from said bowl for supporting said ball segment.

14. The stabilizer bar link of claim 13 wherein said spring tabs are encircled by said axially-extending collar segment of said bearing member having an outer surface which engages an inner surface of said bowl.

15. The stabilizer bar link of claim 10 wherein said bearing member further comprises a plurality of axial slots extending from an open end of said socket and enabling said bearing member to resiliently expand to accommodate entry of said ball segment therein.

16. The stabilizer bar link of claim 10 wherein said retention member is formed integrally with said bearing member.

17. The stabilizer bar link of claim 10 further comprising a seal member engaging said bowl and said ball stud to prevent debris from entering said bowl.

18. The stabilizer bar link of claim 17 wherein said seal member includes a ring segment encircling a perimeter of said bowl.

19. The stabilizer bar link of claim 17 wherein said seal member is formed integrally with said retention member.

20. The stabilizer bar link of claim 17 wherein said bearing member is formed integrally with said bowl and is made of the same base polymer as said housing.

21. A suspension system for a motor vehicle comprising:
   a stabilizer bar;
   a suspension member; and
   a stabilizer bar link interconnecting said stabilizer bar and said suspension member, said stabilizer bar link including a polymer body member having a rod segment and first and second bowl segments formed at opposite ends of said rod segment, a first joint assembly retained in said first bowl segment and connected to said stabilizer bar, and a second joint assembly retained in said second bowl segment and connected to said suspension member, said first and second joint assemblies each including, a bearing member disposed in said bowl segment, said bearing member having a socket including a plurality of inwardly extending spring tabs, and having an axially extending collar portion for engaging said bowl, a ball stud having a ball segment disposed within said socket of said bearing member and supported by said spring tabs, and a retention member having a radially extending annular rim for securing to said bowl such that said radially extending annular rim snap fits inside of said bowl interferingly engaging said bowl segment and abuttingly engaging said bearing member such that said ball stud and said bearing member are retained therein.

22. The suspension system of claim 21 wherein said spring tabs on said bearing member are encircled by said axially-extending collar member having an outer wall surface engaging an inner wall surface of said bowl segment.

23. The suspension system of claim 21 wherein said bearing member further comprises a plurality of axial slots formed therein from an open end of said socket for enabling said bearing member to resiliently expand to accommodate entry of said ball segment therein.

24. The suspension system of claim 21 wherein said retention member includes a radially extending annular rim engaging an annular recess formed in said bowl.

* * * * *